Dec. 7, 1948.  R. TEMPLE  2,455,825
EXPLOSIVELY ACTUATED FASTENING APPARATUS
Filed Aug. 15, 1944  2 Sheets-Sheet 1

INVENTOR.
Robert Temple
BY Brown, Critchlow & Flick
his attorneys.

Dec. 7, 1948.  R. TEMPLE  2,455,825
EXPLOSIVELY ACTUATED FASTENING APPARATUS
Filed Aug. 15, 1944  2 Sheets-Sheet 2

INVENTOR.
Robert Temple
BY Brown, Critchlow & Flick
his attorneys.

Patented Dec. 7, 1948

2,455,825

UNITED STATES PATENT OFFICE 2,455,825

EXPLOSIVELY ACTUATED FASTENING APPARATUS

Robert Temple, Swissvale, Pa., assignor to Temple Velocity Equipment, Inc., Wilmington, Del., a corporation of Delaware Application August 15, 1944, Serial No. 549,545

8 Claims. (Cl. 1—47)

1

This invention relates to explosively actuated fastening apparatus, and more particularly to apparatus for fastening time bombs to the sides of vessels under water.

One way of destroying enemy ships in war is for a diver to attach time bombs to the hull of an anchored ship under water where both he and the bombs will be unobserved. After the diver has made his escape the bombs explode and sink the ship. Various devices have been used for fastening such bombs in place, but in general they have not been very satisfactory. Some of them make too much noise, while others can not be relied upon to hold the bombs in place until they explode.

It is among the objects of this invention to provide explosively actuated fastening apparatus which can be used to fasten a bracket to a wooden or metal object, which is especially suitable for fastening explosive charges to the sides of vessels under water, which is not dangerously noisy in operation, which automatically conceals the manner in which the bracket was fastened in place, and which is self-contained, dependable, compact, small and light in weight.

In accordance with this invention a bracket is fastened in any suitable manner to the device that is to be attached to a supporting member, such as the side of a ship. The bracket has a wall that is to be placed against the supporting member and that is provided with an opening through it. A piercing stud, supported from the bracket, is disposed behind the bracket opening in alignment with it. Explosive means behind the stud, when discharged, drives the stud forward into the bracket opening and the supporting member. The rear end of the stud is formed for tightly engaging the bracket in order to hold it against the supporting member. Most suitably, the stud is slightly larger than the bracket opening so that the stud will tightly engage the wall of the opening. The stud preferably is mounted in a barrel removably carried by the bracket in such a way that the recoil from the explosion separates the barrel from the bracket.

Figure 1:
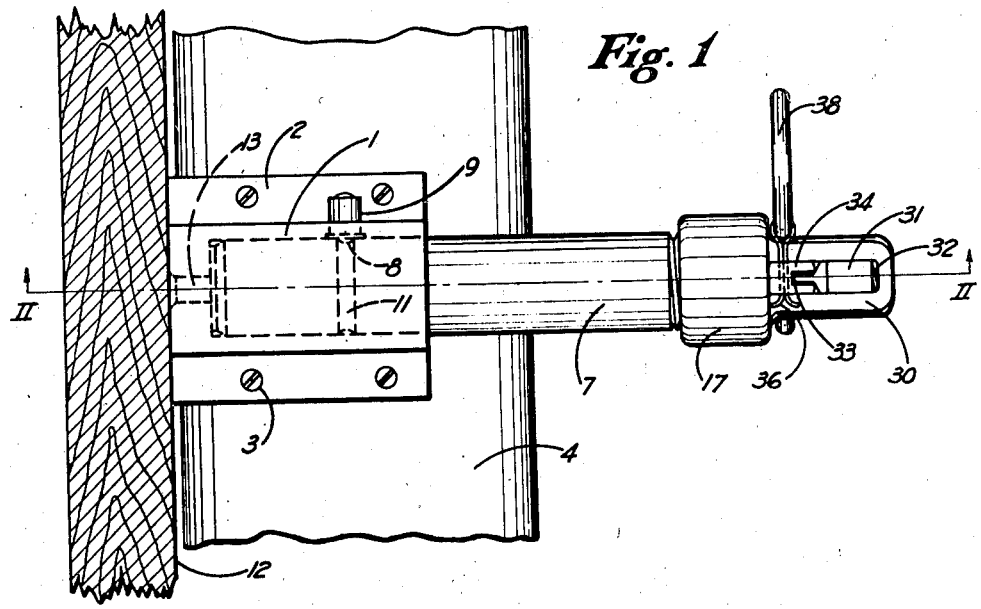
Figure 2:
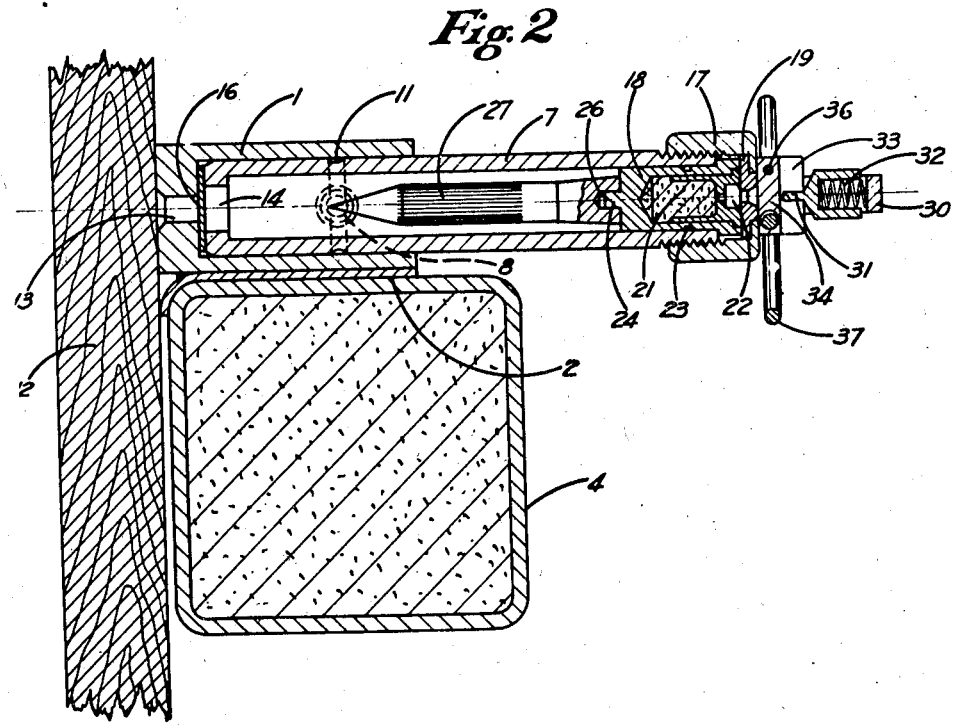
Figure 3:
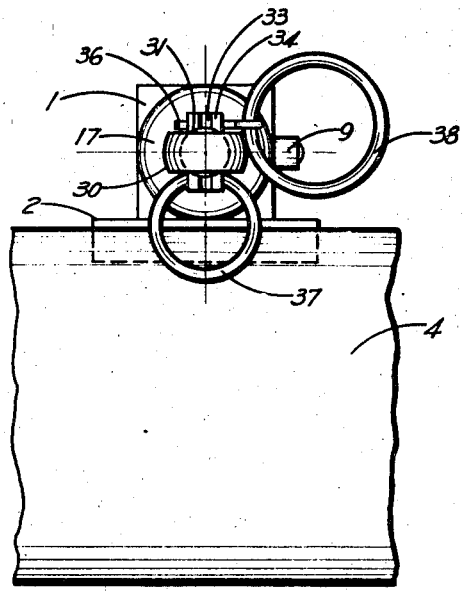
Figure 5:
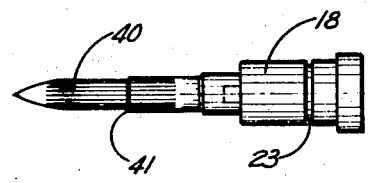
Figure 4:
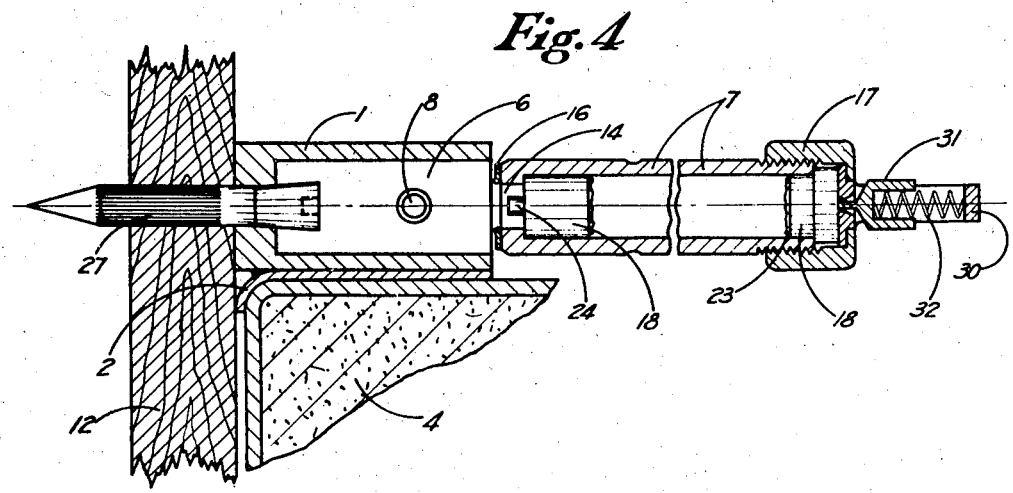

The preferred embodiment of the invention is illustrated in the accompanying drawings in which Fig. 1 is a plan view of my fastening apparatus; Fig. 2 is a vertical section taken on the line II—II of Fig. 1; Fig. 3 is a view of the outer or rear end of the apparatus; Fig. 4 is a view similar to Fig. 2 showing the stud driven into a wooden supporting member with the barrel leaving the bracket; and Fig. 5 is a side view

2 of a cartridge attached to a stud designed for piercing steel plates.

Referring to Figs. 1, 2, and 3 of the drawings, a bracket is formed from a metal block 1 rigidly mounted on a metal plate 2 that can be connected by screws 3 to the member that is to be supported by the bracket, such as a time bomb 4. The block is provided with a rearwardly opening socket 6 (Fig. 4) in which the front portion of a metal barrel 7 is slidably mounted, whereby the barrel is supported by the bracket. The barrel normally is retained in the socket by friction means, such as a spring-pressed ball 8 projecting from a cup 9 mounted in the side wall of the socket. This ball projects into an annular peripheral groove 11 with which the barrel is provided. The wall at the front end of block 1, which is at the inner end of the socket, is adapted to engage a member 12 to which the bracket is to be attached. In the drawings this member is represented as the wooden hull of a ship that it is desired to sink. The front wall of the bracket is provided with a central opening 13 registering with a larger opening 14 in the front end of the barrel. To keep water out of the barrel a sealing disc 16 is placed between the front end of the barrel and the inner end of the socket. This disc may be soldered to the front end of the barrel.

The outer or rear end of the barrel is threaded and a cap 17, provided in its back wall with a central opening, is screwed on it. This cap presses the flanged outer end of a cartridge 18 against the end of the barrel. A reinforcing washer 19 may be disposed between the rear end of the cartridge and the cap. The cartridge, which is the same as the one shown in my Patent No. 2,064,503, contains an explosive charge 21 that can be discharged by a detonator 22 disposed behind it. The central area of the cartridge wall, which substantially engages the inner surface of the barrel, is provided with an annular peripheral groove 23 to weaken it for a purpose to be described presently. The front end of the cartridge is solid and provided with a central boss 24 that extends into and frictionally engages a recess 26 in the rear end of a projectile-like stud 27 disposed in the barrel and provided with a pointed front end. This stud is therefore held by the cartridge in the center of the barrel in alignment with the openings 13 and 14 at its inner end. Barrel opening 14 is at least as large as the largest part of the stud, while bracket opening 13 is smaller than the stud. The rear end of the stud is larger than the rest of it to which it is connected by a tapered area. The enlarged portion of the stud will prevent it from going entirely through member 12 in case that member is thin, so the same amount of powder can be used for all thicknesses of member 12. Also, the stud is knurled to prevent it from being rotated in member 12.

Projecting rearwardly from the back of cap 17 is a yoke 30 having the inner surface of its parallel legs concave. Slidably mounted between these surfaces is the cylindrical hollow rear portion of a firing pin 31 that is urged forward by a coil spring 32. The point of the pin normally projects into a slot 33 in a trigger block 34 extending through the yoke and slidably engaging the back wall of cap 17. This block holds the firing pin back against the resistance of the spring. The trigger block is provided at its opposite ends with openings through one of which a safety key 36 extends and in the other of which a firing ring 37 is mounted. The block can not be removed from the yoke until after the safety key has been withdrawn by means of a ring 38 attached to it. Then, if the firing ring is pulled it will pull the block out of the yoke and permit spring 32 to snap the firing pin forward against the detonator and thus explode the powder in the cartridge. As soon as the explosive force builds up far enough to break the cartridge at groove 23 in its wall, the front portion of the cartridge, acting like a piston, will drive the stud forward through the barrel. Movement of this portion of the cartridge is arrested when it strikes the front wall of the barrel, and the stud and boss 24 then separate. The stud is driven through bracket opening 13 and into member 12, which in this case is wood because the stud shown in Figs. 2 and 4 is designed for penetration of wood. The stud does not entirely leave the bracket because it is brought to a stop by its enlarged and tapered rear end after having been slowed down by the friction between it and the wall of the bracket opening which originally was smaller than the stud. The stud therefore has to enlarge that opening in order to pass through it, so that stud is tighly gripped by the bracket which is thereby held securely against the supporting member 12.

The recoil from the explosion in the cartridge is sufficient to overcome the resistance of the spring-pressed ball 8 in the groove 11 and to drive the light barrel backwardly out of the bracket socket, as shown in Fig. 4. Therefore, everything but the bracket and stud sinks in the water and is lost. This prevents disclosure of how the stud was driven, in case the bomb does not explode and is discovered.

If the bracket is to be attached to a metal plate, such as the steel hull of any enemy vessel, the stud shown in Fig. 5 is preferred. This stud 40 has a front portion small enough to pass through bracket opening 13 without material friction, and a stubstantially cylindrical enlarged portion behind joined to the front portion by a shoulder 41. This enlarged portion is larger than the bracket opening, but it does not reach that opening and start to decrease the velocity of the stud until the front of the stud has penetrated the plate to some extent at least. If the friction between the stud and the wall of the bracket opening is not sufficient to stop the stud, its deceleration will be completed by the head on the rear end of the stud. The sound of the stud penetrating the side of a ship is not apt to attract attention because it is similar to the noise created by someone dropping a tool on deck.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specially illustrated and described.

I claim:

1. Explosively actuated fastening apparatus comprising a bracket adapted to be attached to a supporting member, said bracket being provided with a rearwardly opening socket having a front end wall provided with a central opening therein, a barrel mounted in said socket and having an opening in its front end registering with said bracket opening, and releasable means holding the barrel in the socket, the barrel being adapted to support a piercing stud in line with said openings, said barrel being adapted to receive an explosive charge behind the stud for driving it forward into said openings and supporting member, whereby the stud will project forward from the bracket to hold it against said supporting member.

2. Explosively actuated fastening apparatus comprising a bracket adapted to be attached to a supporting member, said bracket being provided with a rearwardly opening socket having a front end wall provided with a central opening therein, a barrel slidably mounted in said socket and having an opening in its front end registering with said bracket opening, and friction means for normally holding the barrel in the bracket, and the barrel being adapted to support a piercing stud in line with said openings, said barrel being adapted to receive an explosive charge behind the stud for driving it forward into said openings and supporting member, the recoil serving to drive the barrel out of said bracket socket, whereby the stud will project forward from the bracket to hold it against said supporting member.

3. An explosively actuated device for attaching a bracket to a supporting member in front of it, the bracket having an end wall adapted to be placed against the supporting member and provided with an opening, said device comprising means adapted to be connected to the bracket and to support a piercing stud behind said opening in alignment therewith, said means also being formed to support explosively actuated means adapted to drive the stud forward into said bracket opening and supporting member, whereby the stud will project forward from the bracket and support it from the supporting member.

4. An explosively actuated device for attaching a bracket to a supporting member in front of it under water, the bracket having an end wall adapted to be placed against the supporting member and provided with an opening, said device comprising means adapted to be connected to the bracket and to support a piercing stud behind said opening in alignment therewith, a frangible sealing disc adapted to be disposed between the front of said means and said bracket wall to keep water from entering said means through said bracket opening, said means also being formed to support explosively actuated means adapted to drive the stud forward through said disc into said bracket opening and supporting member, whereby the stud will project forward from the bracket and support it from the supporting member.

5. An explosively actuated device for attaching a bracket to a supporting member in front of it, the bracket having an end wall adapted to be placed against the supporting member and provided with an opening, said device comprising means adapted to be connected to the bracket and to support a piercing stud behind said opening in alignment therewith, friction means for normally holding said first-mentioned means and bracket together, said means also being formed to support explosively actuated means adapted to drive the stud forward into said bracket opening and supporting member, whereby the stud will project forward from the bracket and support it from the supporting member, and the recoil serving to overcome the resistance of said friction means to thereby separate said first-mentioned means from the bracket.

6. An explosively actuated device for attaching a bracket to a supporting member in front of it, the bracket having an end wall adapted to be placed against the supporting member and provided with an opening, said device comprising means adapted to be connected to the bracket and to support a piercing stud behind said opening in alignment therewith, said means also being formed to support explosively actuated means adjacent its rear end, a spring-pressed firing pin disposed behind said explosively actuated means, a blocking member normally disposed in front of the firing pin for pressing the pin rearwardly, and means for withdrawing said blocking member from in front of the pin to permit the pin to spring forward, whereby said explosively actuated means will drive a stud forward into said bracket opening and supporting member so that the stud will project forward from the bracket and support the bracket from the supporting member.

7. An explosively actuated device for attaching a bracket to a supporting member in front of it, the bracket having an end wall adapted to be placed against the supporting member and provided with an opening, said device comprising a barrel adapted to be connected to the bracket and having a front wall provided with a central opening adapted to register with the bracket opening, means mounted in the barrel and formed for frictionally engaging the enlarged rear end of a piercing stud to support the stud in alignment with said barrel opening, said barrel being adapted to receive an explosive charge for driving said means forward against the front wall of the barrel to force the stud into said supporting member, whereby the enlarged rear end of the stud will tightly engage the bracket and hold it against the supporting member.

8. Explosively actuated fastening apparatus comprising a bracket adapted to be attached to a supporting member, said bracket being provided with a rearwardly opening socket having a front end wall provided with a central opening therein, a barrel slidably mounted in said socket and having an opening in its front end registering with said bracket opening, the outside of the barrel in the socket being provided with an annular groove, and a spring-pressed detent mounted in the wall of the socket and projecting into said groove to detachably connect the barrel to the bracket, the barrel being adapted to support a piercing stud in line with said openings, and to receive an explosive charge for driving the stud forward into said openings and supporting member, whereby the stud will project forward from the bracket and support it from the supporting member, and the recoil serving to overcome the resistance of said spring-pressed pin to thereby drive the barrel out of said bracket socket.

ROBERT TEMPLE.

REFERENCES CITED

The following references are of record in the file of this patent:

UNITED STATES PATENTS

| Number | Name | Date |
|---|---|---|
| 2,146,923 | Wahlstrom | Feb. 16, 1939 |